US005636245A

United States Patent [19]

Ernst et al.

[11] Patent Number: 5,636,245

[45] Date of Patent: Jun. 3, 1997

[54] LOCATION BASED SELECTIVE DISTRIBUTION OF GENERALLY BROADCAST INFORMATION

[75] Inventors: Darrell E. Ernst, Chipita Park; Donald R. McMillan, Colorado Springs; Thomas L. Folk, Colorado Springs; Steven R. Rogers, Colorado Springs, all of Colo.

[73] Assignee: The Mitre Corporation, McLean, Va.

[21] Appl. No.: 288,040

[22] Filed: Aug. 10, 1994

[51] Int. Cl.$^{6}$ .................................................... H04L 27/00

[52] U.S. Cl. .......................... 375/259; 340/988; 340/989; 342/457

[58] Field of Search ................................ 375/94, 98, 37; 340/989, 990, 991, 992, 993, 988, 996, 825.52; 342/457; 364/449; 370/92, 93, 85.1, 85.13

[56] References Cited

U.S. PATENT DOCUMENTS

| | | | |
|---|---|---|---|
| 4,097,695 | 6/1978 | Grace et al. | 370/92 |
| 4,567,590 | 1/1986 | Bederman | 370/85.13 |
| 4,627,052 | 12/1986 | Hoare et al. | 370/85.13 |
| 4,675,823 | 6/1987 | Noland . | |
| 4,860,352 | 8/1989 | Laurence et al. . | |
| 4,872,162 | 10/1989 | Tanaka et al. | 370/85.12 |
| 5,095,532 | 3/1992 | Mardus | 455/186 |
| 5,187,810 | 2/1993 | Yoneyama et al. | 340/993 |
| 5,214,789 | 5/1993 | George . | |
| 5,235,633 | 8/1993 | Dennison et al. . | |
| 5,243,652 | 9/1993 | Teare et al. . | |
| 5,276,683 | 1/1994 | Ohkubo | 370/92 |
| 5,311,197 | 5/1994 | Sorden et al. | 342/457 |
| 5,365,451 | 11/1994 | Wang et al. | 342/457 |

FOREIGN PATENT DOCUMENTS

| | | | |
|---|---|---|---|
| 2271486 | 4/1994 | United Kingdom | 455/33.2 |

*Primary Examiner*—Stephen Chin
*Assistant Examiner*—T. Ghebretinsae
*Attorney, Agent, or Firm*—Larson and Taylor

[57] ABSTRACT

A system for determining whether information broadcast by a general transmitter is relevant to a particular user based on the location, velocity and/or time of an object of interest includes a remote terminal, a general broadcasting unit, a transmitter at the general broadcasting unit for broadcasting messages including a segment comprising a region, a velocity and/or a time corresponding to an event, as well as an event specific tag, and storage for storing selection criteria including current position, time and/or velocity information of the user and/or manually entered data of interest. The selection criteria may also include event specific tags. The receiver at the remote terminal receives the messages from the transmitter at the general broadcasting unit. A navigational receiver may also be used to acquire navigational information from an appropriate external source. A matching processor at the remote terminal evaluates the segment in the messages, determines if the segment sufficiently matches the stored selection criteria and outputs a match signal. A processor in the remote unit receives the match signal, and processes and disseminates the message in accordance with the match signal.

32 Claims, 1 Drawing Sheet

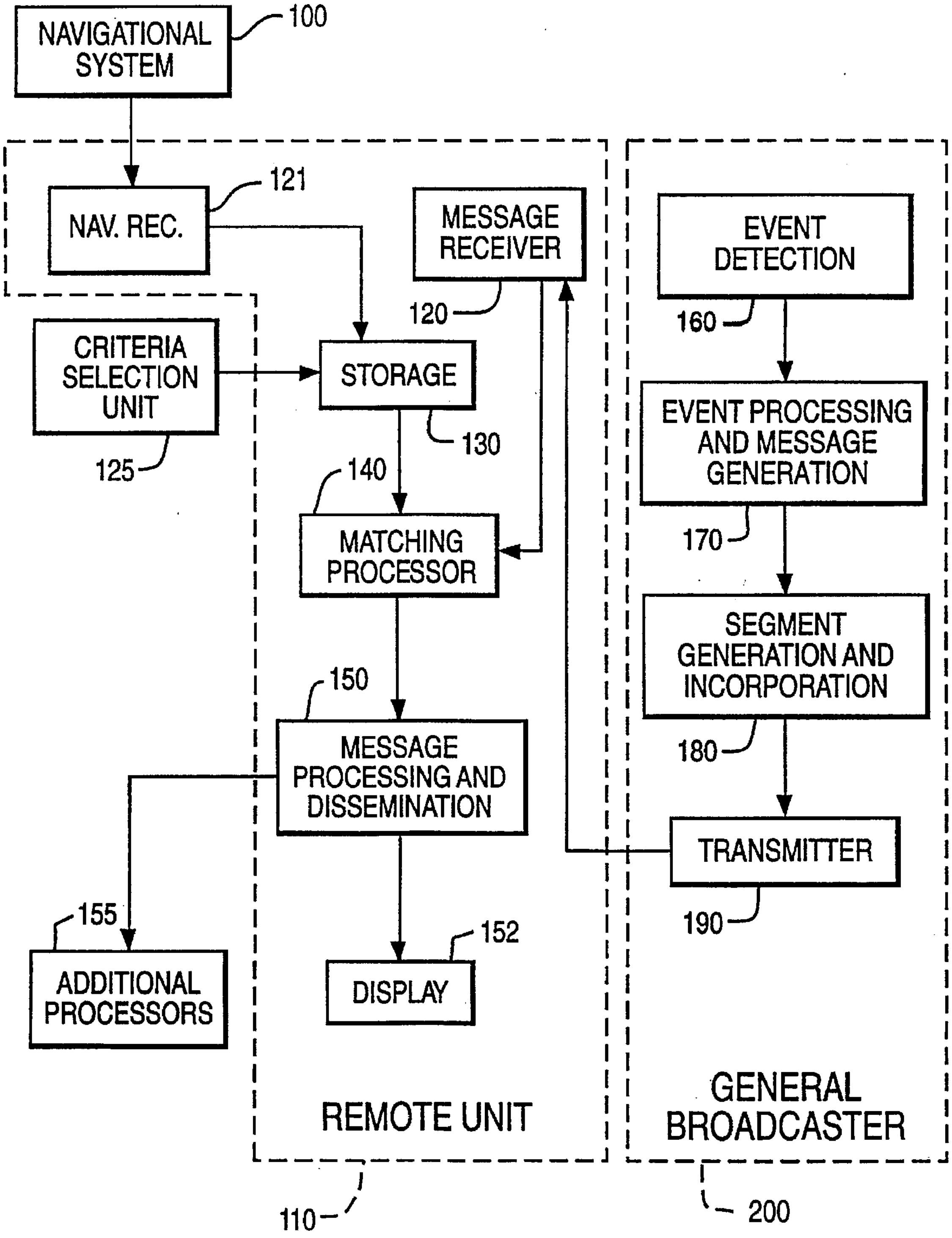
NAVIGATIONAL SYSTEM
100
NAV. REC.
121
MESSAGE RECEIVER
120
CRITERIA SELECTION UNIT
125
STORAGE
130
140
MATCHING PROCESSOR
150
MESSAGE PROCESSING AND DISSEMINATION
155
ADDITIONAL PROCESSORS
DISPLAY
152
REMOTE UNIT
110
EVENT DETECTION
160
EVENT PROCESSING AND MESSAGE GENERATION
170
SEGMENT GENERATION AND INCORPORATION
180
TRANSMITTER
190
GENERAL BROADCASTER
200

LOCATION BASED SELECTIVE DISTRIBUTION OF GENERALLY BROADCAST INFORMATION

BACKGROUND OF THE INVENTION

Currently, region-specific information is disseminated by predetermined point-to-point communication or by general broadcast which must be manually monitored in order to extract information peculiar to a position, velocity and time of interest. For example, marine weather data is continuously broadcast. However, mariners must monitor the broadcast for long periods of time in order to obtain the information peculiar to their region. Even then, the exact region affected may require computation or may be ambiguously defined. There is also the possibility that the user may miss information of interest because he or she occupies an unknown location, is unfamiliar with the region, or uses a different frame of reference, among other reasons.

Another example is tactical ballistic missile (TBM) warning, which is derived from space and ground based sensor data, and is provided through a variety of broadcast and general purpose communications systems to a small subset of in-theater forces. Currently, such warning requires transportable processing stations that can generate information about specific situations in the field but cannot directly communicate with all individuals affected. The timeliness, reliability, and dispersion of information under these conditions are of concern. Because warning is in the form of geographical coordinates and time of predicted impact, users must interpret the data to determine if the warning affects them.

Some current commercial systems are using Global Positioning System information to select relevant data from computer based files such as appropriate electronically stored maps for use in automobiles. These are useful for relatively static information but fail to address dynamic environmental or combat factors.

U.S. Pat. No. 5,243,652 to Teare et al. discloses a database access system in which each mobile user has a positioning system which transmits position information to a central facility. This central facility then grants or denies database access depending on the geographical location of the mobile user.

U.S. Pat. No. 4,860,352 to Laurance et al. discloses a system in which a satellite system determines the position of a transmitter at a first location and a receiver at a second location. The transmitter position is appended to the received message which is sent by the satellite system to the receiver. The receiver receives the appended message, extracts the transmitter position data and compares the extracted transmitter position with a stored transmitter position. If the positions correlate, the receiver knows it has received an authentic message.

None of these devices allow for automated receiver discrimination of any message broadcast generally in order to only disseminate relevant messages.

SUMMARY OF THE INVENTION

It is therefore an object of the present invention to provide a system which is capable of determining whether information broadcast by a general (whether global, regional or local) transmitter is relevant to a particular user based on the location, velocity and/or position of an object of interest.

In accordance with the present invention, these and other objects are achieved by providing a communication system including a remote terminal, a general broadcasting unit, a transmitter at the general broadcasting unit for broadcasting messages including a segment comprising a region, a velocity and/or a time, a receiver at the remote terminal for receiving messages from the transmitter, and a storage for storing data selection criteria. A navigational receiver may receive current position, velocity, and/or time information for that remote terminal to be stored as data selection criteria. Alternatively, the data selection criteria can comprise position, velocity and/or time information relating to an object or objects of interest remote from said remote terminal. Data selection criteria may also be manually entered into the storage. The segment may further include an event specific tag. Event specific tags may be stored in the storage in response to manual input and/or be predetermined and stored in the matching processor. A matching processor at the remote terminal evaluates the segment in the messages, determines if the stored data selection criteria satisfies a match condition to the segment, and outputs a match signal. A message processor in the remote unit receives the match signal, and, when the match signal indicates it is appropriate for the remote unit to receive the message, processes and disseminates the message in accordance with the match signal.

Other objects, features and advantages of the invention will be apparent from the following description of the preferred embodiments.

BRIEF DESCRIPTION OF THE DRAWINGS

The invention will be described below in further detail with reference to the accompanying drawings wherein FIG. 1 is a block diagram of a system according to the present invention.

DETAILED DESCRIPTION OF THE INVENTION

The present invention is directed to a system which determines whether access to particular information transmitted by a broadcaster is appropriate for a particular unit remote from the broadcaster. The invention is particularly useful for implementing a system for distributing situation awareness information. The present invention can use satellite provided services, such as the GPS, to acquire data and establish user relevance based on current location in real time.

Situation awareness encompasses timely understanding of factors within the operational environment which might affect the manner in which the user proceeds. Some specific examples of functions that could be supported are: 1) warning user of impending tactical ballistic missile (TBM) attack, 2) informing combatant of local friend/foe unit positions, 3) advising user on occurrence of Nuclear/Biological/Chemical (NBC) events, 4) disseminating terrestrial conditions such as impassable mud, flood, fire or snowpack, 5) alerting police unit of nearby robbery in progress, 6) advising users (e.g., mariners) of severe weather conditions, 7) providing pilots with airport information, and 8) supplying motorists with information such as location of other vehicles in motion, accidents, areas under repair or blocked, etc. Information might also include appropriate situation-specific actions the user might take.

This capability can be implemented on any hardware platform that interfaces with a global positioning or navigation system or other positioning/navigational inputs, and provides worldwide communications connectivity with the sources of the situation alert bulletins. Remote units that receive, process, and display or operate on the situation awareness information can be mobile, transportable, or stationary.

The system of the present invention is shown in FIG. 1. The navigational system 100 may be, for example, Loran or GPS, or any other source of navigational information, e.g., position, velocity or time. The present invention may operate with either periodic or continuous information delivery systems.

The general broadcaster 200 may include an event detection unit 160 which detects an event. Examples of events to be detected with a suitable detection unit 160 include weather, enemy activity, criminal activity. Detection unit 160 may detect the event directly itself or may receive a detection signal from an external source. Once detection unit 160 detects an event, it outputs information to an event processing and message generation unit 170. Message unit 170 outputs a message generated in response to the event detection output of detection unit 160 to a segment generation and incorporation unit 180. Incorporation unit 180 then defines a position, a velocity and a time of effectiveness for a particular message based, e.g., on a projected history of the event, and incorporates this information as a segment in the message. For time critical applications, the time of effectiveness may be set to the same universal clock unit used in positioning system 100. The segment may also advantageously include an event specific tag which indicates the type of event detected. This segment may be, for example, a header or a footer on the message. The message containing the segment is then transmitted by a transmitter 190.

The remote unit 110 includes a navigational receiver 121 for receiving various information including navigational information from navigating system 100. A storage unit 130 stores position, velocity and/or time information acquired from navigating system 100 by navigational receiver 121 and/or other selection criteria inputs from criteria selection input unit 125. The selection criteria input may include other positions, velocities and/or times to increase the amount of information disseminated, as well as event specific tags to customize and reduce the amount of information disseminated. This information provides the basis for defining matching conditions of interest to the user of remote unit 110. it will be appreciated that there may be a plurality of remote units 110, all receiving information from positioning system 100 and broadcaster 200.

Receiver 120 receives messages transmitted by broadcaster 200. It should be noted that for some applications, the navigation system 100 may serve as the general broadcaster. In this case, the navigational receiver 121 serves as the message receiver. Receiver 120 then outputs this message to a matching processor 140. Matching processor 140 compares the information contained in the segment of the message to the information stored in storage 130. If the stored position, velocity and/or time information are within matching conditions of the position, velocity and/or time information for the segment of the transmitted message, then the message processing and dissemination unit 150 will process and disseminate the information in the message. The matching conditions typically consist of an appropriate position and time window such that exact correlation is not required. Further, information at other regions of interest may be processed by storing additional times, velocities and/or positions, e.g., time, velocity and/or position information based on a projected trajectory of remote unit 110 or based on other remote unit of interest. Additionally, matching processor 140 may compare any event specific tags included in the segment with any event specific tags either stored or matching processor 140 and/or input at criteria selection unit 125 and only allow messages having appropriate event specific tags to be processed and disseminated by unit 150.

Generally, the correlating requirement is a set of user-specified radial distance to the event, whether the user is heading toward or away from an event area, whether the event is past, present, or future relative to the user and the duration of the event. Alternatively, the matching processor 140 could contain the criteria for predefined event types, with appropriate segments, being generated by unit 180 in general broadcaster 200. Specific examples of matching conditions would include whether a combatant was within the circular error probable (CEP) range of an impacting ballistic missile; remote user was within the path of a severe thunderstorm, NBC cloud, flash flood, or forest fire; or the path of the remote user would intersect any of these events in the near future based on their respective velocities.

Dissemination may include audio, tactile or visual alarm or display, or any combination thereof, in display unit 152 and may be provided to one or more users. Dissemination may also include further processing at the processing unit 150 or at additional processing devices 155.

Although the present invention has been described above relative to exemplary preferred embodiments thereof, it will be understood by those skilled in the art that variations and modifications can be effected in these embodiments without departing from the scope and spirit of the invention as defined in the claims which follow.

What is claimed is:

1. A communication system comprising:

a general broadcasting unit comprising a message generating means for generating a generated message related to detection of an event, a segment generating means for generating an information segment comprising at least one of a region, a velocity and a time relating to said event, and for incorporating said information segment into said generated message to produce an outputted message, and a transmitter for broadcasting said outputted message;

a remote unit comprising:

a receiver for receiving said outputted message from said transmitter at said general broadcasting unit, spacial position input means for inputting current spacial position information relating to one of (i) said remote unit and (ii) a further remote region of interest to said remote unit derived from an external spacial positioning system, a storing means for storing said spacial position information and for storing data selection information related to information contained in said information segment, a matching processor connected to said storing means and to said receiver for comparing said information segment in said outputted message with said spacial position information and said data selection information stored in said storing means to determine whether a match condition is satisfied, and for, when a match condition is satisfied, outputting a match signal, and a disseminating means for, responsive to receiving said match signal, processing and disseminating said message in accordance with said match signal.

2. The system as recited in claim 1, wherein said remote unit is mobile.

3. The system as recited in claim 1, wherein said remote unit is transportable.

4. The system as recited in claim 1, wherein said remote unit is fixed.

5. The system as recited in claim 1, wherein said segment generating means incorporates said information segment as a header on said message.

6. The system as recited in claim 1, wherein said storage means stores current position, velocity and time information relating to said remote unit.

7. The system as recited in claim 6, wherein said spacial position input means comprises a navigational information receiver receiving said current position, velocity and time information from a global navigational system.

8. The system as recited in claim 1, wherein said information segment further includes an event specific tag.

9. The system as recited in claim 8, wherein said matching processor includes predetermined, stored event specific tags.

10. The system as recited in claim 1, wherein said remote unit further comprises means for manually entering at least one of position, velocity, time and event specific information into said storing means.

11. The system as recited in claim 1, wherein said disseminating means includes a means for displaying said messages.

12. The system as recited in claim 1, wherein said disseminating means includes an alarm.

13. The system as recited in claim 1, wherein said data selection information stored by said storing means comprises position, velocity and time information relating objects of interest remote from said remote unit.

14. The system as recited in claim 1, wherein said data selection information stored by said storing means comprises a location which is remote from that of said of remote unit.

15. A system as claimed in claim 1, wherein said external spacial positioning system comprises the Global Positioning System.

16. A system as claimed in claim 1, wherein said external spacial positioning system comprises LORAN.

17. A system as claimed in claim 1, wherein said information segment comprises a region of influence impacted by said event.

18. A system as claimed in claim 17, wherein said region of influence is changing.

19. A system as claimed in claim 1 wherein said event is static.

20. A system as claimed in claim 1 wherein said event is moving.

21. A system as claimed in claim 1 wherein said information segment comprises both region and time.

22. A system as claimed in claim 1 wherein said remote unit is mobile and said storage means stores the current velocity of said remote unit.

23. A method of providing selection at a remote unit of generally broadcast messages from a broadcaster, said method comprising the steps of:

transmitting from said broadcaster a message related to detection of an event, said message including an information segment comprising at least one of a position, a velocity, and a time related to said event;

storing data selection criteria at said remote unit relating to information contained in said information segment;

receiving at said remote unit said transmitted message;

receiving and storing at said unit current spacial position information derived from an external spacial positioning system relating to one of (i) said remote unit and (ii) a further remote region of interest in the remote unit;

comparing said information segment in said transmitted message with said stored data selection criteria and said current spacial position information;

determining from said comparing step the occurrence of a match condition; and disseminating said message at said remote unit upon an occurrence of said match condition.

24. The method as recited in claim 23, wherein said disseminating step includes displaying said messages.

25. The method as recited in claim 23, wherein said disseminating step includes activating an aural alarm.

26. The method as recited in claim 23, wherein said disseminating step includes activating a tactile alarm.

27. The method as recited in claim 23, wherein said disseminating step includes activating a visual alarm.

28. The method as recited in claim 23, wherein said disseminating step includes activating another device.

29. The method as recited in claim 23, wherein said storing data selection criteria step comprises manually entering at least one of position, velocity, time and event specific information.

30. The method as recited in claim 23, wherein said storing data selection criteria step comprises inputting current position, velocity and time information relating to said remote unit.

31. The method as recited in claim 23, wherein said remote unit receives transmitted messages from more than one broadcaster.

32. The method as recited in claim 23, wherein said storing step comprises storing a plurality of data selection criteria and said comparing step comprises comparing said information segment with said plurality of data selection criteria.

* * * * *